3,594,335
SHAPED BODIES OF BONDED RIGID
POLYURETHANE FOAM PARTICLES
Gerald A. Schultz, Newfan, and Walter E. Voisinet,
Colden, N.Y., assignors to National Gypsum Company,
Buffalo, N.Y.
No Drawing. Original application Jan. 3, 1966, Ser. No.
518,032. Divided and this application June 12, 1969,
Ser. No. 840,895
Int. Cl. B32b 27/18; C08g 41/00
U.S. Cl. 260—2.5
3 Claims

ABSTRACT OF THE DISCLOSURE

Integral shaped articles are made of comminuted rigid polyurethane foam particles bonded together by the products of the reaction between organic isocyanates and water. The organic isocyanates may be modified with a high melting thermoplastic resin which is reactive with the isocyanates and/or inert inorganic fillers.

CROSS REFERENCE TO RELATED CASES

This application is a division of co-pending application Ser. No. 518 032 filed Jan. 3, 1966, now abandoned.

This invention relates to a method of bonding together particles of foamed polymers. More particularly, it relates to a method of bonding together particles of rigid urethane foam to provide an integral shaped mass of the urethane foam. Thus, this invention provides an economical method for utilizing urethane foam particles of relatively small size to form useful products from such foam particles.

Rigid urethane foam is generally produced by the polymerization of a polyisocyanate, such as a diisocyanate, and a polyhydroxyl compound, such as polyethers and polyesters, in the presence of a blowing agent. In commercial practice, urethane foam is usually made in continuous, high-capacity foam machines, the liquid reaction mixture being discharged onto a moving belt provided with side guides and allowed to expand. After being cured, the resulting foam is in the form of large slabs or blocks of any desired length. These large slabs of rigid foam are then trimmed and subsequently fabricated into many shapes, such as sheets, panel cores, curved segments, beveled blocks and semi-cyclindrical shapes, for such applications as roofing, wall insulation, sandwich panels, insulation for tanks and vessels, and the like. Producing the foam in the form of large blocks and subsequently fabricating the foam into desired shapes provides efficient production of the foam, thereby making it possible to market the foam at prices competitive with other types of thermal insulation.

However, much of the foam of these large blocks is not used or recovered when the blocks are fabricated into smaller shapes. For example, the edges of the block usually must be trimmed to provide the block with a true rectangular cross section from which sheets of uniform thickness may be cut. Thus, during trimming and fabrication of the sheets, core stock, etc., from the large foam blocks, about 15% or more of the foam contained in the large block is lost. This material, which is not recovered, is usually tool small in size and/or too irregular in shape to be used and is generally considered to be scrap. The recovery and utilization of this scrap foam is necessary in order to provide an efficient and profitable operation.

Heretofore, several methods have been suggested for the utilization and recovery of this foam scrap. Thus it has been suggested to thermally degrade the foam scrap to obtain a viscous liquid which is then returned to the foam-forming reaction mixture. It has also been suggested to digest the waste urethane foam in one or more liquids, such as trimethylol propane, and recycle the resulting material to the foam-forming process. Also, it has been suggested to reduce the foam scrap to a very fine particle size, as by ball milling, and add the finely ground foam scrap to the reaction mixture. However, the methods which have been suggested heretofore for the utilization of the foam scrap have not been feasible for one reason or another, for some of the methods are commercially unattractive, some result in the production of foam having poor physical properties, and the like.

It is therefore an object of the present invention to provide a method for the recovery and utilization of rigid urethane foam scrap.

Another object of this invention is to provide an economical method for utilizing urethane foam particles to form useful products from such foam particles.

Another object of the invention is to provide a method for bonding together particles of rigid urethane foam to provide an integral shaped mass of the foam.

Still another object of this invention is to provide a block or molded shape of rigid urethane foam formed by integrally bonding a mass of urethane foam particles.

Various other objects and advantages will appear from the following description of the invention and the novel features will be particularly pointed out hereinafter in the appended claims.

It has now been discovered that rigid urethane foam particles, such as that obtained from the trimming and fabrication of large slabs of urethane foam, may be utilized in the formation of integrally bonded blocks of rigid urethane foam of any desired size and shape. Thus, particles of the foam are bonded together to form an integral block of rigid foam which may then be fabricated into any desired shape. Also, shapes, such as semi-cylindrical shapes, may be molded directly from the foam scrap particles. In this manner the present invention provides an economical, commercially attractive method for the utilization of urethane foam scrap, thereby enabling the recovery of the value of foam presently lost during the trimming and fabrication of shapes from large slabs of urethane foam.

According to the present invention, the foam particles, which may range in size from less than $\frac{1}{16}$ inch up to 1 inch or more, are coated with a binder and compressed in a suitable mold to a desired density and/or thickness. Pressurized steam is then passed through the compacted mat of the binder-coated particles in the mold. After a relatively short period of steam injection, the foam particles are securely bonded together, thereby forming an integral body of the urethane foam particles which may then be removed from the mold. Blocks of rigid urethane foam made in this manner may be fabricated into sheets, panels, or other desired shapes immediately upon removal from the mold, for use in many of the applications where conventional rigid urethane foam is presently used. Rigid urethane foam bodies made according to the present invention have good physical properties and have excellent dimensional stability over a wide range of temperatures.

The particles of rigid urethane foam used in the present invention may vary widely in size, the particles ranging from about $\frac{1}{16}$ inch or less to about 1 inch or more in diameter. Such foam particles are obtained by cutting, chopping, or otherwise comminuting the scrap polyurethane foam. In order to avoid variations in the physical properties and appearance of the integral blocks produced from the foam particles, a mixture of particle sizes should be used, for the smaller particles fill the voids between the larger particles, thereby facilitating the formation of integral blocks having a relatively uniform appearance and physical properties. Thus, while blocks made of only relatively large particles (i.e. ½ to 1 inch or more in size) have excellent physical properties, they contain voids which detract from the appearance and limit the use of shapes fabricated from such blocks. Similarly, while blocks made of only small particles (i.e. less than ½ inch in size) have good appearance due to an absence of voids, such blocks have poorer physical properties than the blocks fabricated from an equal weight of only the large particles. Another disadvantage of using only small particles in forming the bonded blocks is the fact that an undesirably large amount of binder is required in order to bond the small particles into an integral block. These disadvantages can be avoided by using a mixture of foam particle sizes.

Thus, the use of foam having a distribution of particle sizes between $1/16$ inch and 1 inch or more provides blocks having a desirable combination of good physical properties and appearance, for the larger particles enhance the properties of the integral foam blocks while the smaller particles ensure the absence of voids. Foam particles having the size distribution set forth in Table I have been found to produce integral blocks having a desirable combination of good appearance and good physical properties. Therefore, in order to avoid variations in the properties and appearance of the bonded blocks, it is preferred that the foam scrap be comminuted to provide a particle size distribution similar to that shown in Table I. It is to be understood, however, that the invention is not to be limited to particles having the size distribution set forth below.

TABLE I

| Particles size (inches) | | Percent weight |
|---|---|---|
| < | > | |
| 1 | ½ | 16 |
| ½ | ¼ | 47 |
| ¼ | ⅛ | 13 |
| ⅛ | $1/16$ | 10 |
| $1/16$ | | 14 |

The binder, which is coated on the foam particles by spraying, tumbling, or the like, is preferably one that is substantially non-adhesive when applied on the particles and which remains substantially non-adhesive until contacted by the steam. Thus, according to a preferred embodiment of the invention (when the binder is coated on the foam particles, the particles remain substantially dry and non-cohesive so that the particles may be in contact without sticking together, thereby enabling the coated particles to be readily handled, stored and charged into the mold. When the binder-coated foam particles are compressed and contacted by the pressurized steam in the mold, the steam renders the binder adhesive so that it bonds the foam particles together into an integral block of rigid foam. Suitable binders for use in the present invention are organic isocyanates, such as toluene diisocyanate (TDI), diphenyl methane 4,4′ diisocyanate (MDI), polymethylene polyphenyl isocyanate (PAPI), and the like; thermosetting resins, such as phenol-formaldehyde resins, urea-formaldehyde resins, epoxy resins, and the like; thermoplastic resins; and solutions or emulsions of resins, such as vinyl resins. Fire-retarding materials, such as compounds containing phosphorus, antimony, boron or halogens, such as bromine or chlorine, or combinations of halogens with phosphorus and/or antimony, may be included in the binder to improve the flame resistance of the resulting foam block. Also, the organic isocyanate binder may, if desired, be modified by the addition of non-reactive extenders, such as limestone, gypsum, and the like; by the addition of non-reactive plasticizers as a filler; and/or by the addition of a resin which is reactive with the isocyanate. Generally, the total binder content of the foam block may range from about 15% to about 60% by weight of the block. Within this range, it has been found that the compressive properties of the resulting foam block are improved by the addition of increasing amounts of foam particles, while increasing amounts of the binder improve the shear properties of the block. Preferably, the binder comprises between about 20% and 30% by weight of the integral block, for this has been found to provide the best combination of properties.

Thus, excellent bonding of the foam scrap particles has been achieved by coating the particles with an organic isocyanate. When pressurized steam is passed through a compressed mat of foam particles coated with an organic isocyanate, a gelling reaction occurs, forming urea derivatives, the reaction product bonding the foam particles together. Generally, it is preferred to use polymethylene polyphenylisocyanate as the organic isocyanate binder in the process of the present invention. Other organic isocyanates, such as, for example, toluene diisocyanate, diphenylmethane 4,4′ diisocyanate, meta-phenylene diisocyanate, and the like, may, of course, be used as the organic isocyanate binder, but are not as desirable as the polymethylene polyphenyl isocyanate, for the polymethylene polyphenyl isocyanate has a higher functionality and therefore exhibits better cross-linking than the other organic isocyanates. Also, combinations of one or more of the isocyanates may be used to bond the foam particles together. When only an organic isocyanate is used as the binder, it is preferred to coat the foam particles with an amount of isocyanate sufficient to comprise about 20% to 30% by weight of the bonded block. If desired, the isocyanate may be used in conjunction with a solvent in order to reduce the viscosity of the isocyanate.

It has also been discovered that controlled amounts of non-reactive fillers or extenders may be added to the organic isocyanate binder without adversely affecting the bonding of the foam particles or the properties of the integral foam block. Thus, a non-reactive material, such as limestone, gypsum, mica, clay, or the like, in finely divided form, may be dispersed in the isocyanate by forming a slurry of the non-reactive material in the liquid isocyanate and coated on the foam particles. The use of such a non-reactive filler with the isocyanate substantially reduces the cost of the binder system. Alternatively, the non-reactive material may be used with the isocyanate binder by first coating the foam particles with the liquid isocyanate and then mixing the finely divided non-reactive material with the isocyanate-coated particles. The amount of non-reactive filler material used to modify the organic isocyanate may vary from about 4% to about 35% by weight of the binder. When such a binder system is used, the binder preferably comprises from about 20% to 30% by weight of the bonded foam block.

The organic isocyanate binder may also be modified by the addition of a high melting, thermoplastic resin which is reactive with the isocyanate in order to reduce the cost of the binder in the manufacture of integral foam blocks according to the process of the present invention. Thus, it has been found that the use of a naturally occurring, substantially aliphatic hydrocarbon-insoluble pinewood resin, having an appreciable fraction of phenolic and/or acidic constituents, with the organic isocyanate, substantially reduces the cost of the binder required to bond the foam particles into an integral block without adversely affecting the properties of the block. Such aliphatic hydrocarbon-insoluble pinewood resins may be prepared, for example, in accordance with the process disclosed in U.S. Pats. Nos. 2,193,025 and 2,221,540.

Examples of aliphatic hydrocarbon-insoluble pinewood resins suitable for use in the present invention and which are available commercially are: "Vinsol," a product of the Hercules Powder Company, and "Solo," a product of Newport Industries Company. "Vinsol" is a brittle, dark-colored, thermoplastic resin derived from pine wood and is generally obtained from the first cut from solvent extration during the destructive distillation of Southern pine wood. It is a complex mixture of many components with over one-half of "Vinsol" consisting of constituents which are phenolic in character, including phlobaphenes and carboxyl-substituted phenols. "Vinsol" also contains a substantial amount of acidic materials derived from resin acids and oxidized and polymerized resin acids. Some wax and polymerized terpenes are also present. "Vinsol" has a specific gravity of 1.218 (20° C.), an acid number of about 90 to 95, and a softening point of about 110° to 120° C. It is available commercially in pulverized, flake, or granular form.

"Solo" is a dark-colored thermoplastic resin recovered from the wood resin refining process. It is about 94% insoluble in aliphatic hydrocarbons, has an acid number of about 92 to 97, a saponification number of about 140, an unsaponifiable content of about 10% to 14%, a melting point of about 118° C. (Ball and Ring), and is characterized by appreciable phenolic reactivity.

When such naturally occurring wood resins are used in combination with the organic isocyanate, the resin reacts with the isocyanate and softens at higher temperatures to act as a separate binder itself. The resin may be used with the isocyanate in several ways. For example, the resin may be added to the isocyanate before the binder is applied to the foam particles. Thus, the isocyanate is heated to about 170° F. and the resin slowly added with agitation. When the resin addition is complete, a temperature of about 200° F. is maintained for about 30 to 45 minutes. The resulting material may then be used as the binder and sprayed on the foam particles. However, it is generally preferred to coat the foam particles with the isocyanate-resin binder system by first mixing the foam particles with the finely divided solid resin to obtain a uniform resin coating on the particles and then subsequently coating the particles with the organic isocyanate, as by spraying. The amount of reactive resin used to modify the organic isocyanate may vary from about 15% to about 75% by weight of the binder. It has been found that a binder of the resin-modified isocyanate described hereinabove can be used to produce integral foam blocks having properties equivalent to those obtained in blocks containing only an isocyanate binder, but at a cost reduction of about 27% below the cost of using only an isocyanate binder, even though slightly greater amounts of the resin-modified binder are required in order to obtain such equivalent properties. When such a resin-modified isocyanate binder is used to bond the foam particles into an integral block, the amount of binder coated on the foam particles may vary from about 15% to 60% by weight of the foam block.

An even more economical binder can be utilized in the production of integral foam blocks from particles of scrap foam, by modifying the organic isocyanate with both a non-reactive filler and the naturally occurring, aliphatic hydrocarbon-insoluble resin described above. Thus, by first coating the foam particles with the finely divided reactive resin and subsequently applying a coating of a slurry of the non-reactive filler in the isocyanate, an integral foam block can be produced at a cost of about 39% below that required for the production of isocyanate-bonded foam blocks having approximately equivalent properties. In such a tertiary binder system, the isocyanate may comprise from about 10% to 40% by weight of the binder, the non-reactive filler from about 4% to 35% by weight of the binder, and the reactive resin from about 45% to 55% by weight of the binder. A tertiary binder consisting of about 36% polymethylene polyphenyl isocyanate, about 9% of finely divided limestone, and about 55% of finely divided "Vinsol" resin, when used as the binder in the process of this invention, has been found to produce integral foam blocks having an excellent combination of good physical properties, good appearance, and low cost. This three-component binder system is preferably applied by first tumbling the foam particles with the finely divided "Vinsol" resin to provide a coating of the resin on the particles and then spraying the resin-coated particles with a slurry of the limestone in the isocyanate, thereby uniformly coating the particles with these materials. Other methods of coating particles with these materials may, of course, be used. For example, the isocyanate may first be sprayed on the foam and a dry mixture of the limestone and "Vinsol" resin then dusted on the isocyanate-coated particles.

The flame resistance of the bonded foam blocks produced according to this invention is dependent upon the type of foam particles used in forming the blocks. However, as noted hereinabove, a flame retardant can be incorporated in the binder of the present invention to improve the flame resistance of the blocks of bonded foam particles. Thus, when no flame retardant is used, integral blocks formed of non-burning foam particles generally are rated as self-extinguishing when tested according to the procedure set forth in ASTM D–1692–59T. However, the integral blocks are rated as non-burning according to this test method when a flame retardant is incorporated in the binder system. Similary, blocks made from self-extinguishing foam particles can be made non-burning by the use of a flame retardant in the binder. Suitable flame retardants include materials containing phosphorus, antimony, boron halogens, and combinations thereof. Preferred materials include tricresyl phosphate, antimony oxide, tris-beta-chloroethyl phosphate, and the like. Preferably, the flame retardant is present in the binder in amounts ranging from about 10% to 20% of the binder in order to form a non-burning block. The flame retardant may be incorporated in any of the binder systems disclosed hereinabove.

Binders other than the organic isocyanate systems discussed hereinabove may also be used to bond the foam particles into an integral block. Thus, it has been found that thermosetting resins may be used as the binder in the present invention, for the passage of pressurized steam through the compressed mat of resin-coated scrap particles promotes the cure of the thermosetting resin. The thermosetting resins which may be used in this invention are, preferably, liquid resins in which final curing is effected within a relatively short period of time at temperature between room temperature and about 150° C. Suitable liquid thermosetting resins include phenol-formaldehyde resins, urea-formaldehyde resins, and epoxy resins made from a bisphenol and epichlorohydrin together with a suitable hardener such as diamines, dibasic acids, and the like. A uniform, thin coating of the liquid thermosetting resin is applied on the foam particles by spraying and the like. A preferred thermosetting resin for use as the binder in the present invention is an acid-catalyzed phenol-formaldehyde resole, the thermosetting resin preferably comprising from about 20% to 25% by weight of the bonded foam block.

High melting thermoplastic resins may also be used as the binder in the present invention. Thus, a thermoplastic resin, in finely divided form, may be coated on the scrap particles by tumbling, dusting, etc., the thermoplastic resin being softened upon passage of the pressurized steam through the compressed mass of binder-coated particles, and effectively binding the foam particles together when the steam is removed. The thermoplastic resins used as the binder preferably should have a softening point of above about 100° C. but below the temperature of the pressurized steam passed through the binder-coated particles. Suitable high melting thermoplastic resins include the "Vinsol" and "Solo" resins described hereinabove, ethyl cellulose having about a 47% to 48% ethoxy content, and the like.

It has also been found that the foam particles can be bonded together into an integral block by using as the adhesive, resin solutions or emulsions, such as vinyl emulsions. Thus, it has been found that integral bonded blocks of the foam particles may be formed by coating the particles with a resin solution or emulsion and then compressing and steaming the coated particles. The passage of the pressurized steam through the compressed mat of foam particles evaporates the volatile portion of the resin solution or emulsion, thereby bonding the particles together. Particularly good results have been obtained by coating the foam particles with a polyvinyl acetate emulsion containing a plasticizer. Solution or emulsions of other resins may, of course, be used.

Generally, the preferred binder for use in this invention is the tertiary binder system containing about 9% limestone, about 36% polymethylene polyphenyl isocyanate, and about 55% "Vinsol." This binder system provides an economical binder for making a foam scrap block having good physical properties.

In order to provide a substantially uniform binder coating on the foam particles, the particles preferably are continuously agitated, such as by tumbling, while the binder is being applied. When a liquid binder is used, it is preferred to spray the binder on the particles and when a finely divided solid material is used, it is preferred to coat the foam by tumbling with the solid material.

The loose binder-coated foam particles are bonded into an integral, shaped foam body by compacting the particles in a suitable mold having steam inlet openings and subsequently passing pressurized steam uniformly through the compressed mat of binder-coated particles. The passage of the steam through the compacted mat renders the binder adhesive so that it effectively bonds the foam particles into an integral body.

The mold into which the loose binder-coated foam particles are charged may be of any convenient size and shape. Generally, the mold has at least one moveable wall and has steam inlet openings in at least one wall and steam outlet openings in each wall opposing that having the steam inlet openings. Preferably, the mold has fixed, imperforate sidewalls with a foraminous bottom wall extending between the sidewalls, forming a mold cavity. The side walls may be fixedly secured to the bottom wall or may be removably secured thereto. Generally, the latter construction is preferred, for it facilitates removal of the foam body after compression and steaming have been completed. According to a preferred embodiment, the bottom wall is constructed as a steam chest and has a plurality of small openings extending therethrough, the openings being uniformly distributed throughout the bottom wall. In this manner, steam passing up through the openings is uniformly distributed over the entire area of the mold cavity. A perforated top cover, slightly smaller in dimension than the mold cavity, is positioned above the mold cavity, the cover having a plurality of small steam outlet openings uniformly distributed throughout. This top cover is connected to a press means, such as an air cylinder, a hydraulic press, or the like, for vertical movement within the mold cavity so that loose foam particles introduced the mold cavity may be compressed to a desired degree by the top cover. According to another embodiment, the fixed side walls are disposed on the top of an imperforate bottom wall and are provided with steam inlet openings on one side wall and steam outlet openings on the opposite side wall, the inlet openings being connected to a source of pressurized steam. An imperforate top plate, slightly smaller in dimension than the side walls, is provided, the top plate being positioned within the mold cavity after the foam particles have been charged into the mold and adapted to compress the particles within the mold. In this manner, the steam is uniformly distributed across the mold cavity, between the side walls.

The foam particles are then charged into the mold cavity and compressed by pressing the top cover downwardly within the mold cavity. The foam particles are generally compressed to a predetermined thickness, which is dependent in part upon the intended use of the bonded foam block. Instead of compressing the foam particles to a predetermined thickness, the coated scrap particles may be compressed to a desired density. In order to avoid the formation of excessive condensation within the mold when steam is passed through the compressed foam, it is preferred to preheat the mold before the foam particles are charged into the mold cavity. The mold may be preheated by any conventional manner, such as, for example, by the use of heating coils, heating jackets, and the like. Also, the mold may be preheated by passing steam through the mold cavity before the addition of the foam particles. Any condensation formed on the walls of the mold when it is preheated by the steam should be removed before the introduction of the foam. The amount of foam charged into the mold is dependent upon a number of factors: the volume of the compressed foam block to be made, the bulk density of the foam scrap particles, the desired density of the compressed foam block, the desired degree of compression of the loose scrap particles, and the like. The amount of foam placed in the mold cavity must be sufficient to provide a compressed block of the desired thickness having a density in the range of from about 2 to about 8 pounds per cubic foot. Generally, between about 2 and 4 pounds of foam particles having a bulk density of one pound per cubic foot are required for each cubic foot of integral foam block produced. It is to be understood, however, that greater or lesser amounts of foam particles may be used.

Similarly, the pressure applied to the top cover to compress the foam within the mold may also be varied widely. Thus, it has been found that the compression pressure applied to the foam particles directly affects the physical properties of the resulting integrally bonded foam block. That is, the physical properties of the bonded block are improved as the compression pressure increases. The density of the foam particles also affects the compression pressure required, for less pressure is required to compress foam particles having a low density than is required to compress high density foam. The pressure applied to the particles should be sufficient to reduce the volume of the foam particles to about 30% to 70% of its original volume. Generally, pressures within the range of from about 5 to 15 p.s.i., and preferably from about 6.5 to 7.5 p.s.i. are suitable for compacting the foam particles. The foam may be compressed in one step or in two or more steps. Thus, according to one embodiment, the entire amount of foam required to produce a block of the desired size and characteristics is charged into the mold and compressed to the proper thickness and/or density. Alternatively, only from about one-half to three-quarters of the foam is placed in the mold and compressed, whereupon the remainder of the particles are subsequently placed in the mold and compressed at a pressure within the range disclosed above.

After the foam particles are compressed, pressurized steam is passed uniformly through the compacted foam mass to render the binder adhesive, thereby bonding the particles into an integral body. Thus, steam at a pressure of between about 5 to 50 p.s.i.g. and preferably about 15 p.s.i.g., is introduced through inlet openings in one wall of the mold, penetrates through the compressed foam mat, and passes out of the mold through outlet openings in the wall of the mold opposite the wall having the inlet openings. In this manner, the steam is uniformly distributed throughout the mass of compressed foam particles so that a uniform bonding of the particles is obtained. As noted hereinabove, the contact of the steam with the binder coating renders the binder adhesive due to the reaction of the water contributed by the steam with constituents of the binder, or due to the thermal effect of the steam on the binder, or a combination of these factors.

Only a relatively short period of steam injection is required to bond the foam particles into an integral block. Thus, excellent bonding of the foam particles is achieved by injecting steam into the mold for only about 1 to 3 minutes after the steam has passed completely through the compressed mat of foam particles. For example, an integrally bonded block of foam was produced when steam, at a pressure of 15 p.s.i.g., was passed through a 12-inch thick mat of compressed foam particles for 2¼ to 2¾ minutes, of which time 1 to 1¼ minutes was required for the steam to penetrate completely through the compressed foam, after which steaming was continued for an additional 1¼ to 1¾ minutes. Longer periods of steam injection may, of course, be used, depending upon the size and configuration of the integral block to be made.

According to the present invention, the steam is preferably injected into the mass of foam particles only after compression of the foam has been completed. This is due to the fact that the introduction of steam during compression tends to weaken the lower portion of the bonded foam block and causes densification of the bottom portion of the block.

The bonded foam block may be removed from the mold immediately after completion of the steam injection and then allowed to dry. The foam blocks may be dried at room temperature or at elevated temperatures, such as, for example, in an oven having a temperature of about 200–250° F. The dried foam block may then be fabricated by any conventional technique into any desired shape for use in many of the applications where conventional rigid urethane foam is presently used. Alternatively, the foam blocks may be fabricated immediately upon removal from the mold, before drying. Fabrication of the blocks before drying provides the advantage of more rapid drying.

The invention will now be more fully described with reference to several specific examples which are intended to be illustrative only, it being understood that the invention is not limited to the materials, amounts or conditions set forth therein. All percentages and parts are expressed on a weight basis unless otherwise designated.

EXAMPLE I

An integral block of bonded rigid urethane foam particles was produced in the following manner. Particles of rigid urethane foam, having a density of about 1.75–2.0 pounds per cubic foot and a size distribution similar to that shown in Table I, were obtained by mechanical chopping of polyurethane foam scrap, the foam particles having a bulk density of about 1.23 pounds per cubic foot. In a mixing drum was placed 13.4 pounds of the chopped urethane foam which was dry tumbled with 2.58 pounds of finely divided "Vinsol" resin until the resin was uniformly coated on the foam particles. A slurry of 0.42 pound of finely divided limestone in 1.69 pounds of polymethylene polyphenylisocyanate was then coated on the resin-coated foam particles using an air-atomized spray while the particles were continuously agitated. The total mixing time was about 8 minutes, after which the binder-coated particles were charged into a preheated mold 26 inches long by 26 inches wide by 24 inches deep. The side walls of the mold were imperforated and were removeably secured to the foraminous top surface of the steam chest which served as the bottom wall of the mold. A perforated top cover about 25½ inches by 25½ inches in size and connected to an air cylinder was positioned within the mold and the foam particles compressed at a pressure of 6.5 p.s.i. to a thickness of about 12 inches. Steam at a pressure of 15 p.s.i.g. was injected from the steam chest into the compresed foam for 3 minutes, the steam requiring about 1¼ minutes to penetrate through the mold. After the steam injection, the foam block, which was integrally bonded, was removed from the mold and dried at room temperature. The properties of this foam block are set forth in Table II.

TABLE II

| | |
|---|---|
| Density (lb./cu. ft.) | 4.10 |
| Compressive modulus (p.s.i.) | 442 |
| Compressive strength—10% deflection (p.s.i.) | 20.6 |
| Shear strength (p.s.i.) | 9.7 |
| Shear modulus (p.s.i.) | 260 |
| K-factor (B.t.u./in./° F./sq. ft./hr.) | 0.24 |
| Maximum percent volume expansion. At— | |
| −10° F. | −0.61 |
| 90° F. (at 90% R.H.) | +2.06 |
| 200° F. | +0.28 |
| 250° F. | −0.88 |
| 300° F. | −3.23 |

EXAMPLE II

An integral block of rigid urethane foam particles bonded together by an organic isocyanate binder was made by spraying 39 grams of polymethylene polyphenylisocyanate on 130 grams of foam particles having a size distribution similar to that shown in Table I. The isocyanate-coated scrap was then placed in a mold 11 inches long by 11 inches wide by 2½ inches deep and compressed to a thickness of about 2 inches. The mold used had fixed side walls secured to an imperforate bottom wall and was provided with a plurality of steam inlet openings in one side wall and steam outlet openings in the side wall opposite that having the inlet openings. An imperforate top cover was positioned within the mold cavity and used to compress the foam in the mold. Steam at a pressure of 15 p.s.i.g. was passed through the mold via the inlet openings for 1½ minutes. The block of bonded urethane foam particles was removed from the mold immediately after the steam injection and oven dried. The block thus produced consisted of integrally bonded particles of rigid urethane foam and had a density of 2.60 pounds per cubic foot.

EXAMPLE III

An organic isocyanate binder modified with a non-reactive filler was used to bond particles of rigid urethane foam into an integral block in the following manner. In 33.6 grams of polymethylene polyphenylisocyanate was dispersed 8.4 grams of finely divided limestone, and this slurry was sprayed on 130 grams of rigid urethane foam particles. The binder-coated foam particles were then compressed into an integral, bonded block according to the procedure and using the same mold as that described in Example II. The resulting block had a density of 2.65 pounds per cubic foot and had good physical properties.

EXAMPLE IV

Integral blocks of rigid urethane foam particles bonded with an organic isocyanate binder modified with a reactive thermoplastic resin were prepared in the following manner, using the materials set forth below in the amounts indicated.

| | Block | | | | |
|---|---|---|---|---|---|
| | A | B | C | D | E |
| Foam particles (gms.) | 130 | 130 | 65 | 130 | 130 |
| Binder (gms.) | 90 | 40 | 20 | 62 | 160 |
| "Vinsol" resin | 13.5 | 10 | 5 | 30 | 120 |
| Polymethylene polyphenyl isocyanate | 76.5 | 20 | | 32 | 40 |
| Toluene diisocyanate | | | 15 | | |
| Nacconate 4040* | | 10 | | | |
| Density of bonded block (lb./cu. ft.) | 3.46 | 2.62 | 2.73 | 2.98 | |

*Nacconate 4040 is a trade name for crude toluene diisocyanate consisting of a mixture of about 68% 2,4-toluene diisocyanate, 17% 2,6-toluene diisocyanate and 15% other polymeric materials, and is obtained from the National Aniline Division of The Allied Chemical Corporation.

Block A.—A prepolymer of the "Vinsol" resin and the polymethylene polyphenylisocyanate (PAPI) was prepared by heating the PAPI with agitation to about 170°

F., at which temperature the "Vinsol" was slowly added with continuous agitation. When the "Vinsol" addition was completed, the temperature was raised to about 200° F., and held at this temperature for about 30 minutes. The prepolymer, which contained about 15% by weight of "Vinsol," was then sprayed on the foam particles, which had a size distribution similar to that in Table I, and the wetted foam particles compressed into an integral, bonded block according to the procedure and using the same mold as that described in Example II. The resulting block had a density of 3.46 pounds per cubic foot, the binder comprising about 41% by weight of the block.

Block B.—The resin-modified isocyanate binder was prepared by first forming a prepolymer of the "Vinsol" resin and the Nacconate 4040, and thereafter adding the PAPI to the prepolymer. Thus, the 10 grams of "Vinsol" resin were slowly added, with continuous agitation, to the 10 grams of Nacconate 4040 which was at a temperature of about 160°–200° F., which temperature was maintained for about 30 minutes after the "Vinsol" addition was completed. At the end of the 30-minute heating period, the 20 grams of PAPI were added to the prepolymer to provide a binder containing about 25% "Vinsol," about 25% Nacconate 4040, and about 50% PAPI. The binder was then coated on the foam particles, which had a size distribution similar to that shown in Table I, using an air-atomized spray, and the binder-coated foam particles placed in a mold, compressed and steamed according to the procedure and using the same mold as that described in Example II. Upon completion of the steam injection, the foam particles were securely bonded together into an integral block having a density of 2.62 pounds per cubic foot.

Block C.—The resin-modified isocyanate binder was perpared by the slow addition of the 5 grams of "Vinsol," under continuous agitation, to the 15 grams of toluene diisocyanate (TDI) which was at a temperature of about 160°–200° F. The temperature was maintained at about 200°–210° F. for 30 minutes after addition of the "Vinsol" was completed, to provide a prepolymer containing about 25% "Vinsol." The prepolymer was sprayed on the rigid urethane foam particles and the coated foam particles charged into the mold described in Example II and compressed to a thickness of approximately one inch. After the foam was compressed, steam at a pressure of 15 p.s.i.g. was passed through the mold for 2 minutes. Upon completion of the steam injection, the foam particles were securely bonded together into an integral block having a density of about 2.73 pounds per cubic foot.

Block D.—An integral block of bonded foam particles was formed by first coating the foam particles with the finally divided "Vinsol" resin by dry tumbling the foam particles and "Vinsol," and spraying the resin-coated particles, under continuous agitation, with the PAPI. The foam particles were then placed in the mold, compressed, and steamed according to the procedure and using the same mold as described in Example II. Upon completion of the steam injection, the foam particles were securely bonded together into an integral block having a density of 2.98 pounds per cubic foot.

Block E.—An integral block of foam particles bonded together by a resin-modified organic isocyanate was prepared by first spraying the PAPI on the foam to provide a uniform isocyanate coating on the particles, and subsequently tumbling the isocyanate-coated particles with the finely divided "Vinsol" resin. The coated particles were then placed in the mold, compressed and subjected to steam according to the procedure and using the same mold as described in Example II, the steam being injected into the mold for 1½ minutes. Upon completion of the steam injection, the foam particles were securely bonded together into an integral block, the block containing about 55% by weight of binder, of which about 75% was the "Vinsol" resin.

The foam particles used in forming each of blocks A through E were particles of rigid polyurethane foam having a size distribution similar to that shown in Table I hereinabove.

EXAMPLE V

An organic isocyanate binder modified with a non-reactive filler and a reactive thermoplastic resin was used to bond foam particles into integral blocks in the following manner.

Block F.—5811 grams of rigid urethane foam particles having a bulk density of 1.16 pounds per cubic foot were introduced into a mixer and dry tumbled for about 2 minutes with 500 grams of finely divided "Vinsol" resin. A slurry of 100 grams of finely divided limestone dispersed in 400 grams of PAPI was then sprayed on the particles in the mixing drum and the particles tumbled an additional 2 minutes. The coated foam particles were then placed in the 26-inch by 26-inch by 24-inch mold described in Example I, the mold having previously been preheated. The particles were compressed at a pressure of about 6.5 p.s.i. to a thickness of 12 inches, and steam was then injected into the mold for a period of 3 minutes. Upon completion of the steam injection, the foam particles were securely bonded into an integral block, the block having a binder content of about 15%.

Block G.—15 grams of PAPI was sprayed onto 130 grams of rigid urethane foam particles in a mixing drum, and the isocyanate-coated particles were subsequently tumbled with a mixture of 60 grams of finely divided "Vinsol" resin and 40 grams of finely divided limestone. The foam particles, coated with the tertiary binder system, were then placed in a mold, compressed, and subjected to steam according to the procedure and using the same mold as described in Example II, the steam being injected into the mold for 1½ minutes. Upon completion of the steam injection, the foam particles were securely bonded together into an integral block, the block containing about 47% binder.

EXAMPLE VI

Integral blocks of bonded urethane foam particles which are non-burning were made in the following manner.

Block H.—150 grams of rigid urethane foam particles having the size distribution shown in Table I were tumbled in a mixer with 30 grams of finely divided "Vinsol" resin for about 2 minutes, at which time a slurry containing 2.5 grams of powdered limestone and 2.5 grams of tricresyl phospshate in 20 grams of PAPI was sprayed on the particles. The coated foam particles were then charged into a mold, compressed and steamed according to the procedure and using the same mold described in Example II. Upon steaming, the foam particles were securely bonded together. This bonded foam block was non-burning when tested according to ASTM–1692–95.

Block I.—Another non-burning block of bonded urethane foam particles was made by spraying 130 grams of foam particles with 28 grams of a prepolymer formed by adding 3.4 grams of "Vinsol" resin to 21 grams of PAPI at elevated temperatures. Prior to spraying binder on the foam, 5.6 grams of tricresyl phosphate was added to the prepolymer. The coated particles were subsequently compressed and steamed according to the procedure and using the same mold as described in Example II to provide an integral, bonded block of foam.

EXAMPLE VII

As noted hereinabove, a thermosetting resin may be used to bond foam particles together in accordance with the present invention. It was found that an acid catalyzed phenolic resole was one such thermosetting resin which effectively bonded the foam particles into an integral block. The phenolic resole was formed by charging the following reactants into a two-liter flask equipped with a reflux condenser, stirrer, and heating mantle.

| | Gms. |
|---|---|
| 6.9 m. phenol | 649 |
| 10.32 m. formaldehyde (37%) | 836 |
| Sodium hydroxide | 6 |

The mixture was heated to reflux and refluxed for one hour and then cooled and water decanted from the cooled, refluxed mixture to provide a phenolic resole having approximately 86% solids content. 46.5 grams of this resole was sprayed on 130 grams of urethane foam particles and 4 grams of a catalyst comprising a mixture of equal parts of 50% toluene sulfonic acid and 50% phosphoric acid was subsequently sprayed on the resole-coated particles. The coated foam particles were then compressed and subjected to steam according to the procedure and using the same mold as described in Example II, steam being injected into the mold for about 3 minutes. The steam cured the thermosetting resin, thereby bonding the foam particles into an integral block 2 inches thick having a density of 2.73 pounds per cubic foot.

EXAMPLE VIII

A high-melting thermoplastic resin may also be used to bond foam particles into an integral block in accordance with the present invention. Thus, "Vinsol" resin, having a softening point of about 110–120° C., has been used to effectively bond foam particles together, this block having been made by tumbling 130 grams of foam particles together with 60 grams of finely divided "Vinsol" resin. The coated foam particles were then compressed and subjected to steam at a pressure of 15 p.s.i.g., in the same manner as described in Example II to provide an integral block of foam particles, the block having a density of 2.94 pounds per cubic foot.

EXAMPLE IX

Particles of rigid urethane foam were bonded together into an integral block by a resin emulsion binder in the following manner, 80 grams of a polyvinyl acetate emulsion was diluted with 25 grams of water and sprayed on 130 grams of urethane foam particles. The resin emulsion comprised about 58% polyvinyl acetate, about 20% dipropylene glycol dibenzoate as a plasticizer, and about 22% water. The coated particles were then compressed and steamed for 4 minutes according to the procedure and using the same mold described in Example II. The resulting block of bonded foam particles was removed hot from the mold and oven dried at 200° F.

It will be understood that various changes in the details, materials, steps, and arrangement of parts which have herein been described in order to explain the nature of the invention may be made by those skilled in the art within the principle and scope of the invention as expressed in the appended claims.

We claim:

1. An integral body of comminuted rigid polyurethane foam particles bonded together by the products formed in a reaction between water and a modified organic isocyanate binder having a modifier selected from the group consisting of finely divided inert inorganic filler selected from the group consisting of limestone, gypsum, mica, clay and combinations thereof, and high melting finely divided substantially aliphatic hydrocarbon insoluble pine wood resin which is reactive with organic isocyanate.

2. The body of rigid polyurethane foam particles as defined in claim 1 in which said binder consists of an organic isocyanate modifier with about 4% to about 35% by weight of said finely divided inert inorganic filler.

3. The body of rigid polyurethane foam particles as defined in claim 1 in which said binder consists of an organic isocyanate modified with about 15% to about 75% by weight of said finely divided substantially aliphatic hydrocarbon insoluble pin wood resin.

References Cited

UNITED STATES PATENTS

| 3,055,850 | 9/1962 | Worsley et al. | 260—2.5 |
| 3,114,722 | 12/1963 | Einhorn et al. | 260—2.5AIC |
| 3,124,557 | 3/1964 | Eichhorn | 260—2.5 |
| 3,251,916 | 5/1966 | Leathem et al. | 264—125 |
| 3,374,785 | 3/1968 | Gaylord | 161—168X |
| 3,401,128 | 9/1968 | Terry | 264—123X |
| 3,452,127 | 6/1969 | Lovette et al. | 264—123X |

FOREIGN PATENTS

| 996,523 | 6/1965 | Great Britain | 260—2.5AM |

ROBERT F. BURNETT, Primary Examiner

R. O. LINKER, Jr., Assistant Examiner

U.S. Cl. X.R.

161—168; 264—123

PO-1050
(5/69)

UNITED STATES PATENT OFFICE
CERTIFICATE OF CORRECTION

Patent No. 3,594,335          Dated July 20, 1971

Inventor(s) Gerald A. Schultz and Walter E. Voisinet

It is certified that error appears in the above-identified patent and that said Letters Patent are hereby corrected as shown below:

In the address, "Newfan" should be ---Newfane---.

Column 4, line 32, "patricles" should be ---particles---;

same column, line 73, "2,193,025" should be ---2,193,026---.

Column 6, line 27, "similary" should be ---similarly---;

same column, line 48, "temperature" should be ---temperatures---.

Column 7, line 49, "accordinging" should be ---according---.

Column 11, line 35, "perpared" should be ---prepared---;

same column, line 44, "approaximately" should be ---approximately---.

Column 12, line 54, "ASTM-1692-95" should be---ASTM-1692-59---.

Claim 2, 3rd line, "modifier" should be ---modified---.

Claim 3, second last word, "pin wood" should be ---pine wood---.

Signed and sealed this 18th day of January 1972.

(SEAL)
Attest:

EDWARD M. FLETCHER, JR.      ROBERT GOTTSCHALK
Attesting Officer             Acting Commissioner of Patents